United States Patent
Wong

(10) Patent No.: US 11,109,348 B2
(45) Date of Patent: *Aug. 31, 2021

(54) TELECOMMUNICATIONS APPARATUSES AND METHODS

(71) Applicant: Sony Corporation, Tokyo (JP)

(72) Inventor: Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,248

(22) Filed: Feb. 19, 2020

(65) Prior Publication Data
US 2020/0187158 A1    Jun. 11, 2020

Related U.S. Application Data

(63) Continuation of application No. 15/748,764, filed as application No. PCT/EP2016/072441 on Sep. 21, 2016, now Pat. No. 10,582,472.

(30) Foreign Application Priority Data

Sep. 25, 2015 (EP) .................................. 15186982

(51) Int. Cl.
*H04W 68/02* (2009.01)
*H04W 72/04* (2009.01)
*H04W 4/70* (2018.01)

(52) U.S. Cl.
CPC ......... *H04W 68/02* (2013.01); *H04W 72/042* (2013.01); *H04W 72/0453* (2013.01); *H04W 4/70* (2018.02)

(58) Field of Classification Search
CPC ............... H04W 68/02; H04W 72/042; H04W 72/0453; H04W 4/70
See application file for complete search history.

(56) References Cited

U.S. PATENT DOCUMENTS

2015/0131579 A1*  5/2015  Li ........................ H04L 1/1858
                                                              370/329
2015/0208415 A1   7/2015  Hao et al.
(Continued)

FOREIGN PATENT DOCUMENTS

WO    2017/029009 A1    2/2017

OTHER PUBLICATIONS

3GPP TSG RAN WG2 #91, R2-153448, Aug. 24-28, 2015, pp. 1-3 (Year: 2015).*

(Continued)

*Primary Examiner* — Farid Seyedvosoghi
(74) *Attorney, Agent, or Firm* — Xsensus LLP

(57) ABSTRACT

A method of transmitting paging information to a terminal in a telecommunications system via a wireless interface, wherein the terminal is operable to decode received messages transmitted at a first repetition level or at a second repetition level. A message transmitted at the first repetition level is repeated a number N1 of times and a message transmitted at the second repetition level is repeated a number N2 of times, with N1<N2. The method includes: transmitting a first paging allocation message to the terminal in a downlink search resources space and at the first repetition level; and transmitting a second paging allocation message to the terminal in a downlink search resources space and at the second repetition level.

20 Claims, 6 Drawing Sheets

START

S101: transmitting a first paging allocation message (PAM1) to a terminal in a downlink search resources space and at the first repetition level S102: transmitting a second paging allocation message (PAM2) to the terminal in a downlink search resources space and at the second repetition level

END

(56) References Cited

U.S. PATENT DOCUMENTS

2016/0227514 A1 8/2016 Richard et al.
2017/0280481 A1* 9/2017 Stern-Berkowitz ............... H04W 74/008
2018/0184434 A1 6/2018 Yufei et al.

OTHER PUBLICATIONS

3GPP TSG RAN WG1 meeting 75, R1-135646 (Ericsson, Nov. 11-15, 2013), (Year: 2013).*
3GPP TSG RAN WG1 Meeting #75, R1-135646, Ericsson, Physical downlink control channel for enhanced coverage MTC UE, Nov. 11-15, 2013, 6 pages (Year: 2013).
LTE Advanced, "3rd Generation Partnership Project; Technical Specification Group Services and System Aspects; Service requirements for Machine-Type Communications (MTC); Stage 1 (Release 13)", 3GPP TS 22.368 V13.1.0 (Dec. 2014), Total 26 pages.
Harri Holma, et al., "LTE for UMTS OFDMA and SC-FDMA Based Radio Access", John Wiley and Sons, 2009, Total 4 pages.
Huawei, et al, "Paging transmission for MTC UEs", Huawei HiSilicon, 3GPP TSG RAN WG1 Meeting #80, R1-150064, Feb. 9-13, 2015, Total 3 pages.
Ericsson, "Common control messages for MTC", 3GPP TSG-RAN WG1 Meeting #78bis, R1-143789, Oct. 6-10, 2014, Total 6 pages.
International Search Report dated Dec. 23, 2016 in PCT/EP2016/072441 filed Sep. 21, 2016.
Office Action dated Jul. 21, 2020, in corresponding Chinese patent Application No. 201680051068.X, 22 pages.
Samsung, "Paging reception procedure in the enhanced coverage mode", 3GPP TSG RAN WG2 #91, R2-153448, Aug. 24-28, 2015, Beijing, P.R.China, total 3 pages.
Office Action dated Nov. 4, 2020 in Japanese Patent Application No. 2018-515798, 12 pages.
Panasonic, "Search space for MTC", 3GPP TSG RAN WG1 Meeting #82, R1-153961, Beijing, China, Aug. 24-28, 2015, 8 pages.
InterDigital, "Paging for MTC UE", 3GPP TSG RAN WG1 Meeting #81, R1-153248, Fukuoka, Japan, May 25-29, 2015, 5 pages.
Sony, "M-PDCCH Repetition for LC-MTC", 3GPP TSG RAN WG1 Meeting #82, R1-154214, Beijing, PR China, Aug. 24-28, 2015, 7 pages.
Sony, "Considerations on Paging in Coverage Enhanced operation", 3GPP TSG RAN WG1 Meeting #82bis, R1-155614, Malmo, Sweden, Oct. 5-9, 2015, 5 pages.

* cited by examiner

TELECOMMUNICATIONS APPARATUSES AND METHODS

CROSS-REFERENCE TO RELATED APPLICATIONS

The present application is a continuation of U.S. application Ser. No. 15/748,764, filed Jan. 30, 2018, which is based on PCT filing PCT/EP2016/072441, filed Sep. 21, 2016, which claims priority to EP 15186982.3, filed Sep. 25, 2015, the entire contents of each are incorporated herein by reference.

FIELD

The present disclosure relates to telecommunications apparatuses and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customers home and periodically transmit data back to a central MTC server relating to the customers consumption of a utility such as gas, water, electricity and so on. Smart metering is merely one example of potential MTC device applications. Further information on characteristics of MTC-type devices can be found, for example, in the corresponding standards, such as 3GPP TS 22.368 version 13.1.0 Release 13 (2014-12) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

Amongst the techniques proposed to reduce the complexity, cost and power consumption of such devices, a first one is the restriction of the frequency band that the devices operate on. Currently, it has been proposed that a Low Complexity ("LC") terminal would operate in a bandwidth of no more than 6 Physical Resource Blocks "PRBs". In LTE, 6 PRBs correspond to bandwidth of 1.4 MHz. When a limited bandwidth is provided for a terminal with limited capabilities to operate on is provided, it is often referred to as a "narrowband". The bandwidth of the telecommunication system can therefore be divided into multiple 6 PRBs narrowbands and an LC-MTC terminal is expected to be able to tune into any of these narrowbands.

Another technique to increase coverage for MTC and LC-MTC devices is the use of repetitions. In this Coverage Enhancement (CE) feature, the coverage for LC-MTC can be extended by up to 15 dB (relative to that of Cat-1 terminal) by repeating the symbols or messages transmitted to the LC-MTC. Using numerous repetitions of the same information, the coverage provided by the base station can be extended. The receiver can accumulate the repeated signal which in effect simulates a single high power transmission.

While the repetition techniques can improve the coverage provided by a base station, they can also make the paging of terminals less efficient in terms of power required from the terminal and of time required to reach the terminals.

SUMMARY

According to a first example aspect, there is provided a method of transmitting paging information to a terminal in a telecommunications system via a wireless interface, wherein the terminal is operable to decode received messages that are transmitted at a first repetition level or at a second repetition level, wherein a message transmitted at the first repetition level is being repeated a number N1 of times and a message transmitted at the second repetition level is being repeated a number N2 of times, with N1<N2, the method comprising transmitting a first paging allocation message to the terminal in a downlink search resources space and at the first repetition level; and transmitting a second paging allocation message to the terminal in a downlink search resources space and at the second repetition level. In some examples the first and second paging allocation messages could be different messages and in other examples they may be the same messages, sent to the same terminal but repeated at a different time.

In some examples, the transmission of the first paging allocation message may start at the same time as the transmission of the second paging allocation message, or the transmission of first or second paging allocation message may start before the end of the transmissions of the second or first, respectively, paging allocation message.

In some examples, the first paging allocation message is transmitted in the same bandwidth as the bandwidth for transmitting the second paging allocation message. For example, transmitting the second paging allocation message may comprise transmitting the first paging allocation message (e.g. by transmitting the same message a number of times N2>N1).

According to a second example aspect, there is provided a method of operating a mobile node in a telecommunications system for paging a terminal via a wireless interface, wherein the terminal is operable to decode received messages that are transmitted at a first repetition level or at a second repetition level, wherein a message transmitted at the first repetition level is being repeated a number N1 of times and a message transmitted at the second repetition level is being repeated a number N2 of times, with N1<N2, the method comprising: instructing the transmitter to transmit a first paging allocation message to the terminal in a downlink search resources space and at the first repetition level; instructing the transmitter to transmit a second paging allocation message to the terminal in a downlink search resources space and at the second repetition level.

According to a third example aspect, there is provided a mobile node for use in a telecommunications system, wherein the mobile node comprises: a transmitter; a receiver; and a controller, wherein the mobile node is configured to page a terminal via a wireless interface, wherein the terminal is operable to decode received messages that are transmitted at a first repetition level or at a second repetition level, wherein a message transmitted at the first repetition level is being repeated a number N1 of times and a message transmitted at the second repetition level is being repeated a number N2 of times, with N1<N2, the mobile node being configured to page the terminal comprising the controller being configured to: instruct the transmitter to transmit a first paging allocation message to the terminal in a downlink search resources space and at the first repetition level; instruct the transmitter to transmit a second paging allocation message to the terminal in a downlink search resources space and at the second repetition level.

According to a fourth example aspect, there is provided a integrated circuitry for a mobile node for use in a telecommunications system, wherein the integrated circuitry comprises a controller element and a transceiver element configured to operate together to page a terminal via a wireless interface, wherein the terminal is operable to decode received messages that are transmitted at a first repetition level or at a second repetition level, wherein a message transmitted at the first repetition level is being repeated a number N1 of times and a message transmitted at the second repetition level is being repeated a number N2 of times, with N1<N2, wherein the controller element and the transceiver element being configured to operate together to page the terminal comprises the controller element and the transceiver element being configured to operate together to instruct the transmitter to transmit a first paging allocation message to the terminal in a downlink search resources space and at the first repetition level; instruct the transmitter to transmit a second paging allocation message to the terminal in a downlink search resources space and at the second repetition level.

According to a fifth example aspect, there is provided a method of operating a terminal for use in a telecommunications system, wherein the terminal comprises a transmitter; a receiver; and a controller, the controller being configured to decode messages received by the receiver and that are transmitted at a first repetition level or at a second repetition level, wherein a message transmitted at the first repetition level is being repeated a number N1 of times and a message transmitted at the second repetition level is being repeated a number N2 of times, with N1<N2; the method comprises decoding, at one of the first and second repetition levels, a paging allocation message received by the receiver in a search resources space, the paging allocation message being one of two paging allocation messages, each of the two paging allocation messages being sent at a different one of the first and second repetition levels.

According to a sixth example aspect, there is provided a terminal for use in a telecommunications system, the terminal comprising: a transmitter; a receiver; and a controller, wherein the controller is configured to decode messages received by the receiver and that are transmitted at a first repetition level or at a second repetition level, wherein a message transmitted at the first repetition level is being repeated a number N1 of times and a message transmitted at the second repetition level is being repeated a number N2 of times, with N1<N2; decode, at one of the first and second repetition levels, a paging allocation message received by the receiver in a search resources space, the paging allocation message being one of two paging allocation messages, each of the two paging allocation messages being sent at a different one of the first and second repetition levels.

According to a seventh example aspect, there is provided integrated circuitry for a terminal for use in a telecommunications system, wherein the integrated circuitry comprises a controller element and a transceiver element configured to: decode messages received by the receiver and that are transmitted at a first repetition level or at a second repetition level, wherein a message transmitted at the first repetition level is being repeated a number N1 of times and a message transmitted at the second repetition level is being repeated a number N2 of times, with N1<N2; decode, at one of the first and second repetition levels, a paging allocation message received by the receiver in a search resources space, the paging allocation message being one of two paging allocation messages, each of the two paging allocation messages being sent at a different one of the first and second repetition levels.

According to a eighth example aspect, there is provided a method of paging a terminal in a telecommunications system via a wireless interface, wherein the terminal is operable to decode received messages that are transmitted at a first repetition level or a second repetition level, wherein a message transmitted at the first repetition level are being repeated a number N1 of times and a message transmitted at the second repetition level are being repeated a number N2 of times, with N1<N2, wherein the method comprises transmitting a paging allocation message in a downlink search resources space and at both the first and second repetition levels, the paging allocation message allocating paging resources in a paging resources space; and transmitting a paging message in the allocated paging resources, wherein the transmission of the paging message starts at a time which is before the end of the transmission of the paging allocation message.

According to a ninth and tenth example aspect, there is provided computer software which, when executed by a computer, causes the computer to perform any of the above methods and a storage medium which stores the computer software, respectively.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
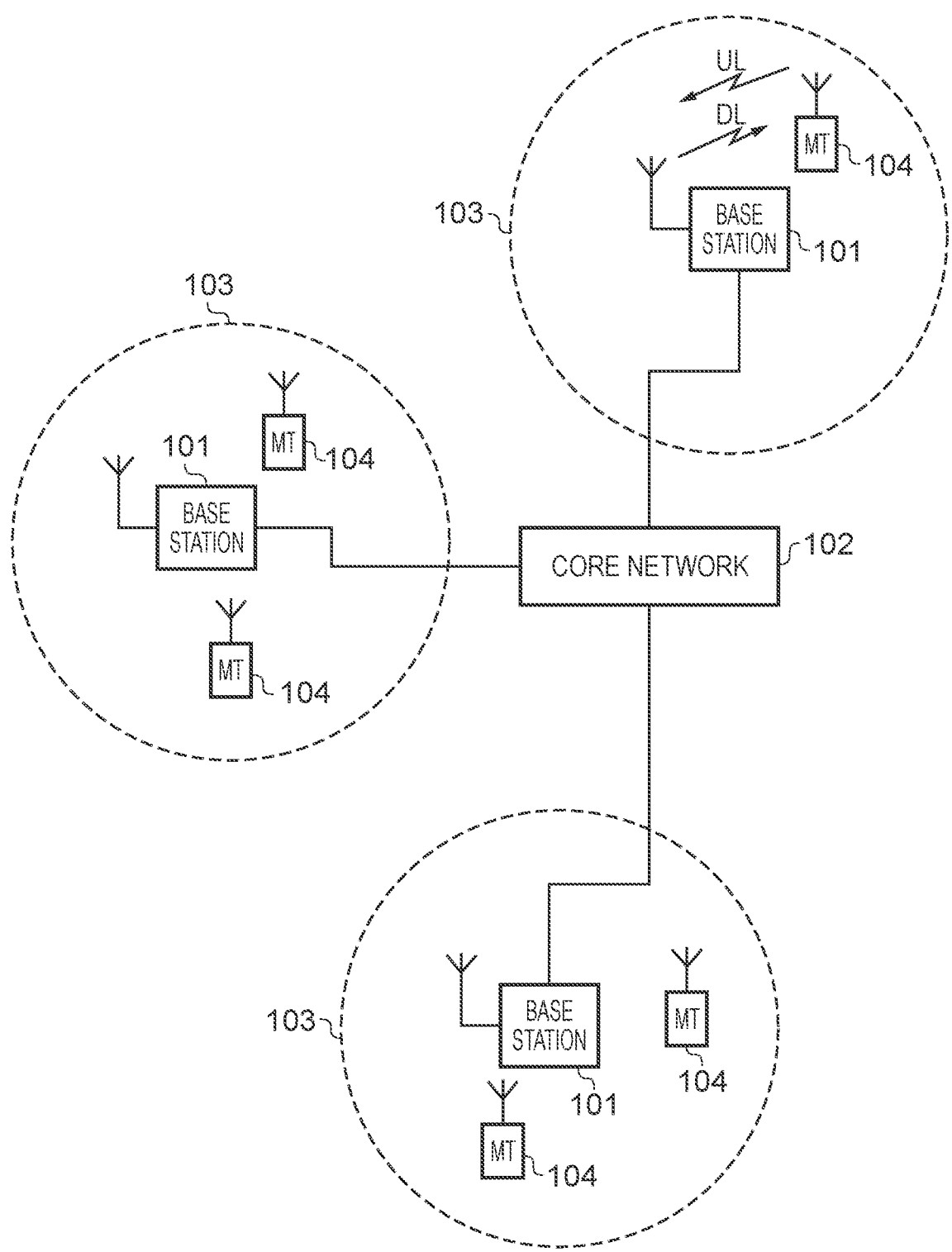
FIG. 1 provides a schematic diagram illustrating an example of a mobile telecommunication system.

FIG. 1 provides a schematic diagram illustrating some basic functionality of a mobile (cellular) telecommunications network/system 100, in this example operating generally in accordance with LTE principles, and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma, H. and Toskala, A. [2]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network. The core network 102 routes data to and from the terminal devices 104 via the respective base stations 101 and provides functions such as authentication, mobility management, charging and so on. In addition to the base stations 101 and terminal devices 104, the system may further comprise one or more relay nodes/devices. These may be used to enhance coverage for terminal devices operating in the relevant cell(s). The deployment of relay nodes (e.g. in terms of their locations) may follow generally established techniques for using relay nodes to support coverage in wireless telecommunications systems. In terms of terminology, it will be appreciated that terminal devices may also be referred to as mobile stations, user equipment (UE), user terminal, mobile radio, mobile terminal, mobile device and so forth. Similarly, base stations may also be referred to as transceiver stations/nodeBs/e-nodeBs, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

In the present coverage extension discussions, three CE levels are being considered, where a CE level 1 has a relatively low number of repetitions compared to the CE levels 2 and 3 and wherein the CE level 2 has a relatively low number of repetitions compared to the CE level 3. In one example, a CE level 1 may involve 20 repetitions, a CE level 2 may involve 50 repetitions and a CE level 3 may involve 200 repetitions. Although three levels of CE levels will generally be discussed herein, the skilled person will understand that the same principle apply to fewer (e.g. two) repetition levels or to more repetition levels. Also, in some examples the lowest repetition number may be "1", such that the first repetition level considered corresponds to effectively no repetition being applied while a second (or third, etc.) level considered corresponds to applying a repetition of two or more times (e.g. 100 times, or more/less).

In a conventional mobile network where a repetition scheme is implemented for coverage extension, the base station is generally not made aware of any changes in the repetition settings for a terminal since they have last been communicating, i.e. for a terminal in idle mode. In effect the base station can proceed in one of two ways: either it will always assume the worst case situation and assume a poor coverage level (i.e. a high repetition level) or it will use the last known coverage level (if any), start paging the terminal using this coverage level and if no reply is obtained, then it will try paging the terminal with more repetitions and so on. When more than one terminals are paged at the same time (e.g. all terminals within a cell), the paging is transmitted at the maximum power/repetition level in order to reach the cell edge. However this can use a lot of resources for the terminal to decode the paging-related messages as the number of repetition can be unnecessarily high and/or this can delay the transmission of the paging message due to a high number of repetition and/or an incorrect low repetition level which causes the paging to restart with a higher repetition level.

Figure 2:
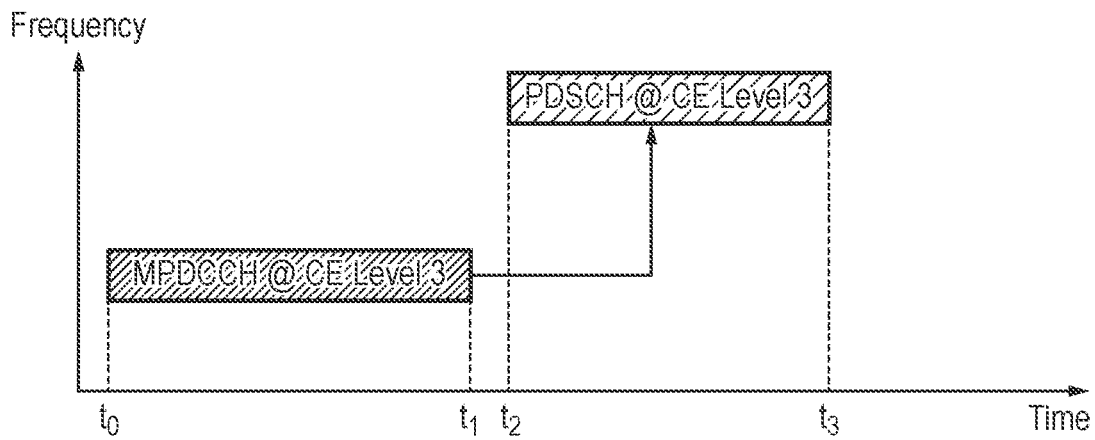
FIG. 2 illustrates a conventional paging situation with coverage extension.

More specifically, FIG. 2 illustrates a conventional paging situation with coverage extension. Paging is conventionally used by the network to page a terminal in idle mode so that the terminal will start a RRC connection. The terminal will wake up at specific paging times and will listen for paging messages to determine whether any paging message is addressed to it. In other examples, it can also be used to page all terminals in a cell (in idle or connected mode) to inform them of a system information (SI) change or to send a broadcast message such as an Earthquake & Tsunami Warning System (ETWS) or a Commercial Mobile Alert System (CMAS) message. In the legacy system, the paging message is carried by the Physical Downlink Shared Channel (PDSCH) and is scheduled by a Downlink Control Information (DCI) message in the Physical Downlink Control Channel (PDCCH) which is effectively a common search space for all terminals to search for paging messages addressed to them. In a CE mode of operation, a similar scheme is used to schedule the paging message, that is, a DCI is transmitted in the MPDCCH (MTC-PDCCH) common search space to schedule the PDSCH carrying the actual paging message. It has also been suggested that for indications of SI change, ETWS and CMAS message, a DCI carried by the MPDCCH could contain such indication without any corresponding message being transmitted on the PDSCH. In most cases, the paging will be carried out as illustrated in FIG. 2, where the DCI is transmitted on the MPDCCH from $t_0$ to $t_1$ and repeated at level 3, assuming the worst case scenario, the DCI allocating resources for the paging message in the PDSCH. The paging message is then transmitted on the PDSCH from $t_2$ to $t_3$ and also at a repetition level 3. Accordingly, the terminal is expected to blind decode the MPDCCH for any paging DCI, assuming a level 3 repetition, and once the transmission of the DCI is completed, it is expected to decode the PDSCH for the actual paging message, also at an assumed repetition level of 3. Even though the same principles would apply even if it was decided that the base station would page the terminal at the last known repetition level, in practice it is very likely that the paging DCI would be repeated at a level 3 in most, if not all, cases as well. That is, the base station is likely to try to page several terminals within a time period, and as soon as one has to be pages at a CE level three, then the base station will repeat all of the paging DCI at a level 3 because it is critical that identical signals are being transmitted and repeated throughout the repetition period. In other words, if the base station stops transmitting some of the paging messages within this period, then the repeated signals will differ and a terminal in CE level 3 could thus fail to receive the MPDCCH correctly as a result. As a result, it is likely that the paging will in most or all cases be carried out assuming a maximum repetition level (level 3 in the above example). As previously discussed, while this is seen as being unavoidable, it comes with limitations.

In accordance with the present disclosure, there is provided an arrangement wherein a paging allocation message (e.g. a DCI on a MPDCCH) is transmitted at different repetition levels and wherein the transmission of a corresponding paging message (e.g. on a PDSCH) starts from a time t which is based on a decoding of the paging allocation message for the lowest repetition level (with the lowest number of repetitions) of the different repetition levels. The paging message may then be repeated based on this lowest repetition level. The paging message may also be transmitted from a second time t' which is based on a decoding of the paging allocation message for another of the different repetition levels. The paging message may then be repeated based on the another repetition level. Accordingly, as soon as a terminal can decode a paging allocation message for its repetition level, it can find and decode the corresponding paging message based on this repetition level. This enables a reduction in the time for the terminal to find any paging message addressed to it while the base station can still transmit the paging information assuming that terminals are in the worst case situation and that, should this be the case, they will be able to access the paging information without delay (e.g. compared to ramping up the coverage level for paging messages). Decoding a message early can thus provide the advantage of reducing the power consumption in decoding that message.

Figure 3:
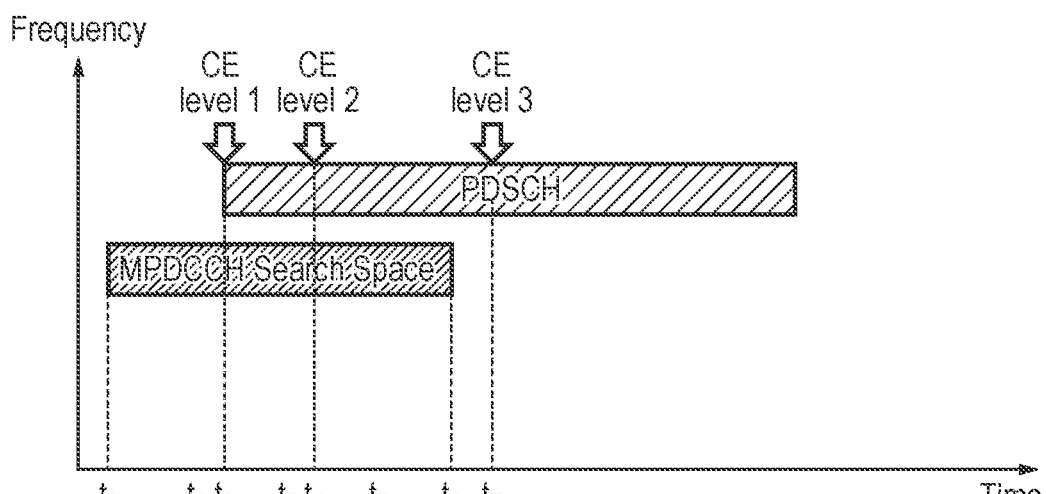
FIG. 3 illustrates an example of paging terminals in accordance with the present disclosure.

FIG. 3 illustrates an example of paging terminals in accordance with the present disclosure. In this example, the paging allocation message (e.g. a DCI) is transmitted in a downlink search space or resource space (which may be used to carry only this type of messages or also other types of messages) such as a MPDCCH in LTE, at three different repetition levels L1, L2 and L3 from $t_0$ to $t_6$. Then the transmission of the paging message corresponding to the paging allocation message can start in resources allocated by the paging allocation message and in a paging space or paging resource space (which may be used to carry only this type of messages or also other types of messages), such as a PDSCH in LTE, at corresponding repetition levels L1, L2 and L3, from time $t_2$. Rather than having the transmission of the paging message start after the transmission of the allocation message for it, i.e. after $t_6$, the transmission can start at a time $t_2$ which is defined based on a decoding of the paging allocation message at a repetition level lower than the highest one, e.g. L1 or L2, and in the example of FIG. 3, at the lowest repetition level L1. Accordingly, if a terminal can decode the paging allocation message at level L1 based on its transmissions between $t_0$ and $t_1$, it can then start decoding the PDSCH/allocation message at level L1 from time $t_1$. Likewise, if the terminal can decode the paging allocation message at level L2 based on its transmission between $t_0$ and $t_3$, it can start decoding the PDSCH/allocation message at level L2 from time $t_4$. If however the terminal cannot decode the paging allocation message at a lower repetition L1 or L2 and can only decode it at the highest repetition level L3, then the terminal can still decode the corresponding paging message from time $t_7$ and does not have to wait for another paging allocation to be transmitted at L3 as would happen with a ramping up of the repetition levels. Thus, a terminal (e.g. LC-MTC terminal) at a more favourable radio condition (i.e. at lower repetition level or CE level) would be able to complete reception of the paging message quicker.

In this example the paging allocation message (DCI) is transmitted with different repetition levels in the same bandwidth (e.g. a narrowband for MTC devices) and the paging message is transmitted with different repetition levels in the same bandwidth (e.g. a narrowband for MTC devices) but in other example the paging allocation message and/or the paging message can be transmitted in different bandwidths depending on the repetition level, as will be clear from at least the examples below. It is also noteworthy that although the PDSCH of FIG. 3 has been illustrated as a single block, this is a schematic representation and, for example, the transmission of the paging message at L1 may finish before the transmission of the paging message at L2 starts such that there is effectively a pause in the signals for transmitting the paging message between different repetition levels. Likewise, the resources for transmitting the paging message may not use the entire breadth of the paging resource space and may only use some of the frequency and/or time resources within the paging resource space from the transmission start point until the send point.

In some examples, different paging allocation messages are sent for different repetition levels. For example, for paging one or more terminals at two different repetition levels, two different paging allocation messages may be sent, a first one at the first repetition level and a second one at the second repetition level. The first paging allocation message may be allocating a first set of resources in a first bandwidth for transmitting the paging message at the first repetition level while the second paging allocation message may be allocating a second set of resources in a second bandwidth for transmitting the paging message at the second repetition level. The first and second bandwidth may be identical or different and, if identical, the first and second sets of resources may be the same or different. As an illustration, in the example of FIG. 3, three different allocation messages may be sent, the first one indicating the resources for the paging message sent at the first repetition level (from $t_2$), the second one indicating the resources for the paging message sent at the second repetition level (from $t_4$) and the third one indicating the resources for the paging message sent at the third repetition level (from $t_7$). In other examples, the same allocation message may be sent as shown in more detail in FIG. 4.

Figure 4:
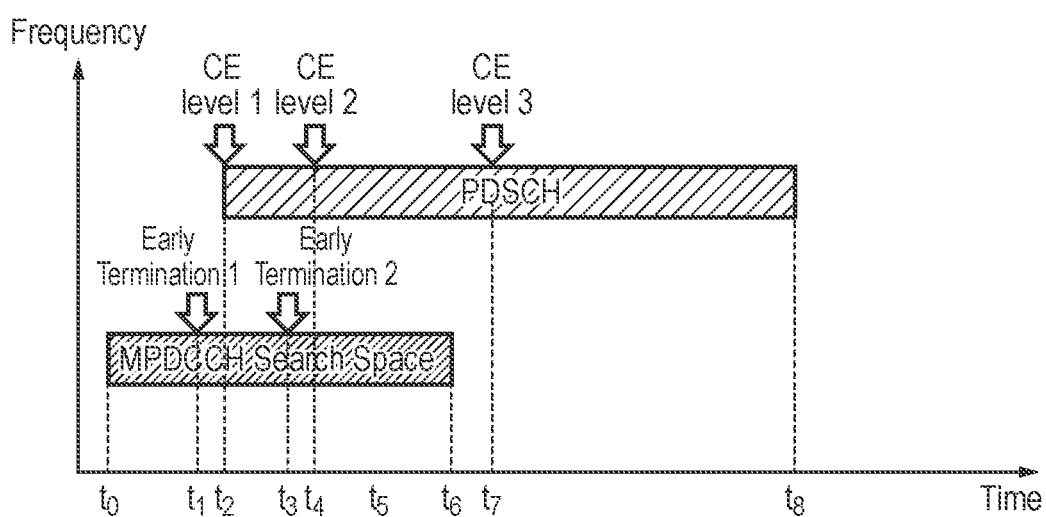
FIG. 4 illustrates an example of paging terminals in accordance with the present disclosure.

FIG. 4 illustrates another example of paging terminals in accordance with the present disclosure. In this example, the same paging allocation message, e.g. DCI, is sent in the search space and at the desired maximum repetition level, e.g. L3. By transmitting the message at the repetition level L3, it is also automatically transmitted at the lower repetition level, e.g. L1 and L2. The allocation message may indicate the resources used for transmitting the paging message at the corresponding desired maximum repetition level, e.g. L3 (which also implicitly transmits the paging message at lower levels, e.g. L1-L2). The terminal decoding the paging message may then determine the level at which the allocation message was decoded and, accordingly, determine the time at which to start decoding the paging message using the allocated resources. Accordingly, if a terminal can decode a message sent at a repetition level lower than the repetition level used for transmitting the message, it can stop decoding the message at that point rather than continue decoding this message until it has been transmitted for the full number of repetitions. This is called an early termination point.

Figure 5:
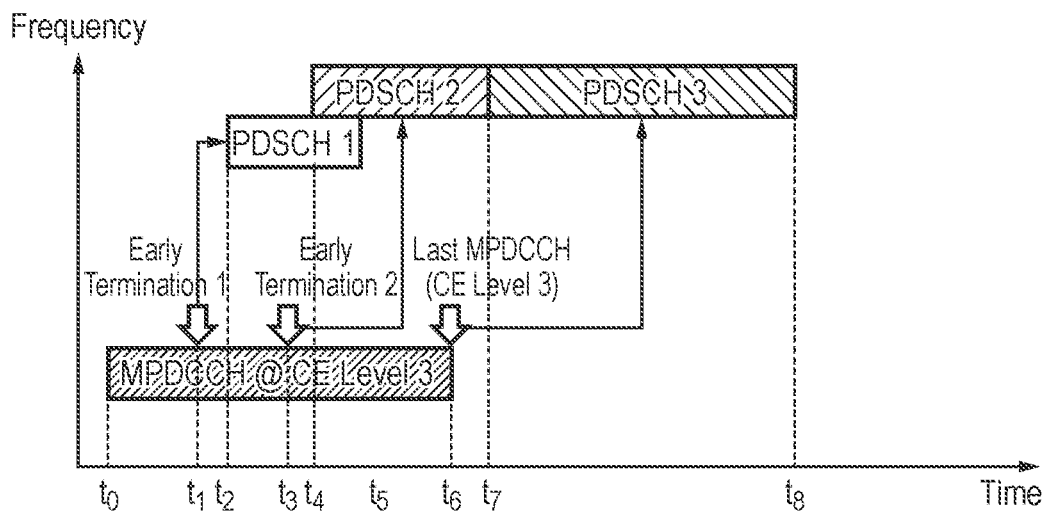
FIG. 5 illustrates an example of paging terminals in accordance with the present disclosure.

This embodiment recognises that the base station would be likely to be expected to transmit the allocation message at the highest repetition to target the largest CE level and hence this would not waste any additional resources in doing so. Multiple CE Levels can still be supported by having the terminal (e.g. a LC-MTC UE) terminate its repetitions early at different points of this repetition. Accordingly, blind decoding of multiple MPDCCH candidates (multiple allocation messages) may no longer be required and only a simple detection of the presence or absence of a paging allocation message transmission may be used in some cases. These early termination points can for example be defined and known to the terminal such that the PDSCH can start after an early termination point, as illustrated in FIG. 5, where the highest CE level is Level 3 and the MPDCCH is repeated at L3 to reach terminals at CE Level 3. Two early termination points are defined, i.e., Early Termination 1 at time $t_1$ and Early Termination 2 at time $t_3$ that have sufficient repetitions to target CE Level 1 and CE Level 2 respectively. The MPDCCH search space starts at time t0 that has a single DCI/paging allocation message candidate and a terminal at CE Level 1 would attempt to decode the MPDCCH at time $t_1$, and if it successfully decodes the DCI, it will start receiving the PDSCH at time $t_2$ (and finishes the PDSCH reception before the entire PDSCH ends at time $t_8$). If it fails, it will try to decode it at the next Early Termination point (i.e. Early Termination 2 at time $t_3$) until the end of the MPDCCH repetition. The terminal would fail to detect any DCI if it cannot detect or decode the MPDCCH after the end of MPDCCH repetition at time $t_6$.

In other examples, different PDSCHs (e.g. using different narrowbands) may be used for sending the paging message and for different early termination points as shown in FIG. 5. FIG. 5 illustrates a further example of paging terminals in accordance with the present disclosure.

In this example, different early termination point leads to different PDSCHs that can have different bandwidths (e.g. different narrowbands for PDSCH 1 and PDSCHs 2-3) or the same narrowband occupying different resource elements within the narrowband and/or separated in time (e.g. PDSCH 2 and PDSCH 3). One example technique for determining which PDSCH (e.g. which narrowband) to use is to have an implicit time and/or frequency offset to the PDSCH (or narrowband) indicated in the DCI where this offset is dependent upon the early termination point. For example if terminal finishes at Early Termination 1, then the PDSCH is located one narrowband below that indicated by the DCI but if the terminal finishes at Early Termination 2, then the PDSCH is located in the narrowband indicated by the DCI and the decoding starting point is offset to $t_4$.

Figure 6:
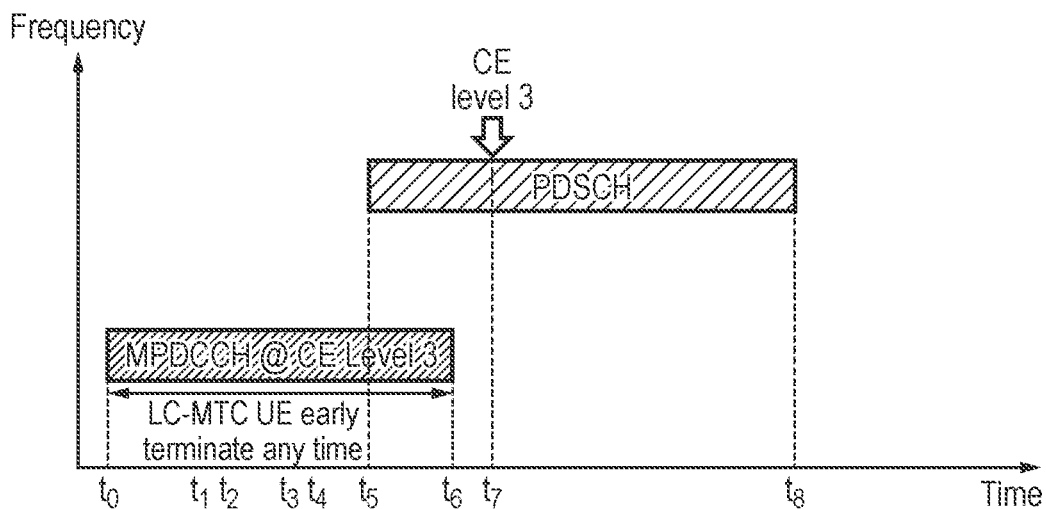
FIG. 6 illustrates an example of paging terminals in accordance with the present disclosure.

In other examples, early termination points are not specifically defined and it is up to the terminal to decide when it wishes to early terminate the paging allocation message repetitions. FIG. 6 illustrates yet another example of paging terminals in accordance with the present disclosure. In which no early termination point is defined between the start (time $t_0$) and end (time $t_6$) of the paging allocation message repetition. Instead, the terminal can decide when it wishes to early terminate the repetition between time $t_0$ and $t_6$. It should be noted that, according to present conventions, if the paging allocation message transmission/MPDCCH ends at a subframe n, then the paging message transmissions/PDSCH repetition starts at the n+k subframe such that this time would be after time $t_6$. In FIG. 6, the paging message transmission/PDSCH starting time $t_5$ can be made earlier so that a terminal that early terminates (i.e. complete paging allocation message transmission/MPDCCH reception prior to time $t_6$) does not need to wait till the end of the MPDCCH repetition to receive the corresponding PDSCH (at time $t_7$). While it would otherwise be possible to have time $t_5=t_7$, this would result in a delay in the paging transmissions for all terminals which would be able have an early termination and which do not require the highest repetition level.

Figure 7:
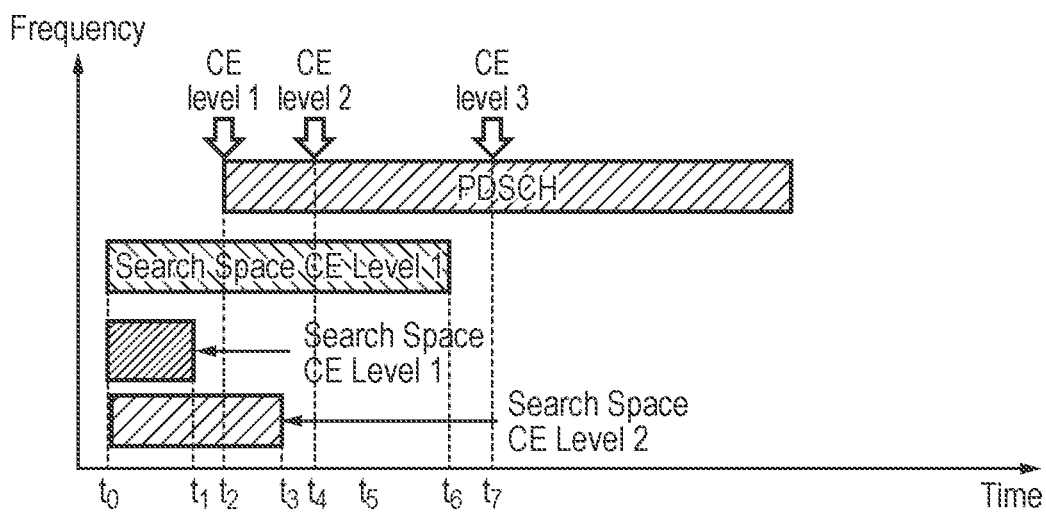
FIG. 7 illustrates an example of paging terminals in accordance with the present disclosure.

While in the previous illustrations the paging allocation message(s) at different repetition was transmitted in the same bandwidth (e.g. narrowband), in other examples different paging allocation messages may be sent in different bandwidths depending on the repetition level. FIG. 7 illustrates a further example of paging terminals in accordance with the present disclosure where three paging search spaces (MPDCCH) are used, with one for each of the three CE levels. In this example, the paging allocation messages/DCIs from the different search spaces schedule the same narrowband for the PDSCH but starts at different time.

Figure 8:
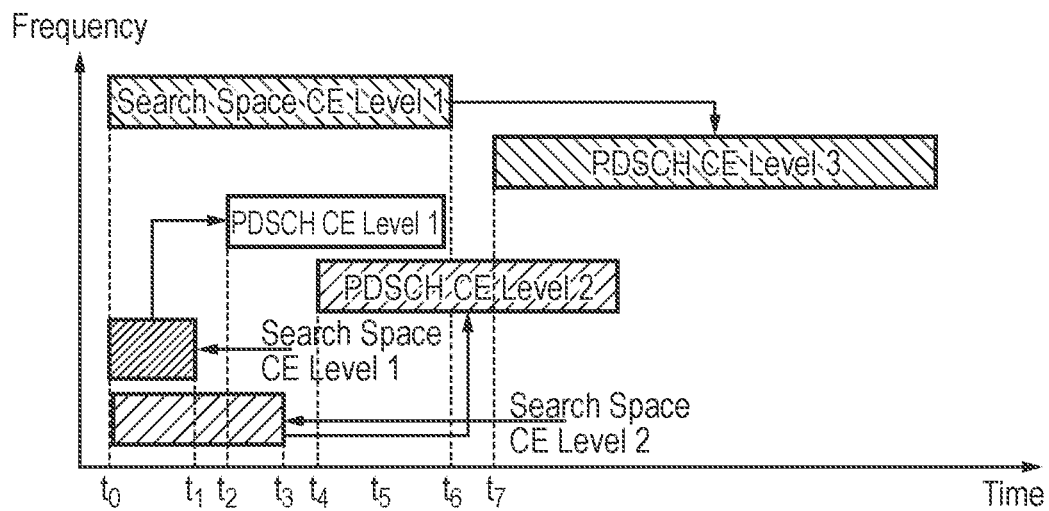
FIG. 8 illustrates an example of paging terminals in accordance with the present disclosure.

It should also be appreciated that multiple frequency resources, e.g. bandwidths (for example narrowbands for LC-MTC terminals), can be used for the PDSCH carrying the paging message, such that different CE level uses different narrowband for the PDSCH as shown in FIG. 8 which illustrates another example of paging terminals in accordance with the present disclosure. In this case different paging allocation messages are being transmitted in different narrowbands and the same paging message is transmitted in different narrowbands, wherein the narrowbands for the paging allocation message and for the paging message are determined based on the level of repetition. This can also enable the transmission of different information (e.g. containing CE level specific info) with the paging message, for example appended to the paging message. In other cases no further information is added to the paging message which is transmitted without the addition of additional, e.g. repetition level-specific, information.

Figure 9:
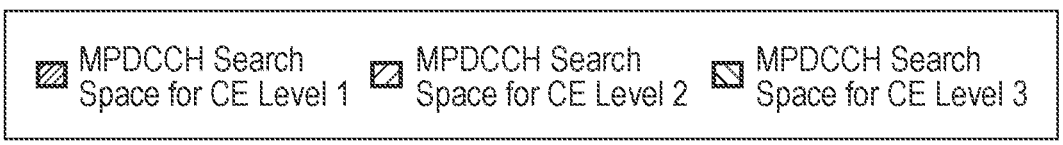
FIG. 9 illustrates an example of paging terminals in accordance with the present disclosure.
Figure 9:
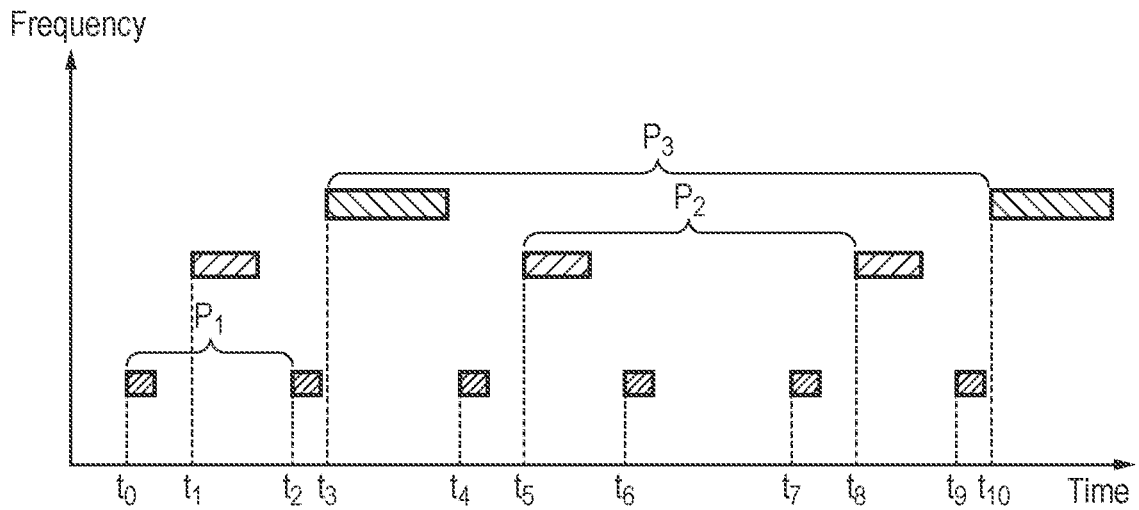

Although in the examples above, the paging allocation message for the different repetition level are being transmitted from the same time, in other example they may be transmitted at different times. FIG. 9 illustrates an example of paging terminals in accordance with the present disclosure where the paging allocation messages for different repetition levels are being transmitted at different times. In this example, the DCIs of different CE levels are transmitted on MPDCCHs at different Paging Occasions, that is, DCIs of different CE levels are transmitted at different time. The CE level of a Paging Occasion may for example be known to the LC-MTC UE (e.g. based on information indicated in the System Information Blocks "SIBs" and/or defined in a protocol or specification) where an MPDCCH search space appropriate for that CE level is used. In the example shown in FIG. 9, three CE levels are used. In this example, the MPDCCH search spaces at different CE level occurring at different time (i.e. Paging Occasion) occupy different narrowband. It should be appreciated that they can occupy the same or different bandwidth (e.g. the same narrowband), and, for illustrative purposes, they have been shown as being on different bands. Also, the Paging Occasion for different CE levels may have different periodicity, and in the example in FIG. 9, the periodicities are P1, P2 and P3 for CE Level 1, CE Level 2 and CE Level 3 respectively where P3>P2>P1. Again, it will be appreciated that same periods can be used for multiple CE levels. A terminal (e.g. LC-MTC UE) believing it is in CE level mode 1 would then wake up from its Discontinuous Reception (DRX) at time to and would try to decode for a possible DCI that schedules a paging message at CE Level 1. If however this terminal fails to decode any MPDCCHs it can proceed to the next Paging Occasion for CE Level 2 (which has a higher MPDCCH repetition) at time $t_1$. The CE level is generally not known to the base station but it is known to or estimated by the terminal (e.g. LC-MTC UE) such that if the first decoding attempt fails, it is generally expected that the second decoding attempt at a higher repetition level would be successful. As the terminal knows/estimates the repetition level it is currently at, this terminal can avoid waking up at some Paging Occasion. For example if it knows that it is in CE Level 3, this LC-MTC UE need not wake up at Paging Occasion corresponding to CE Level 1 and CE Level 2.

Figure 10:
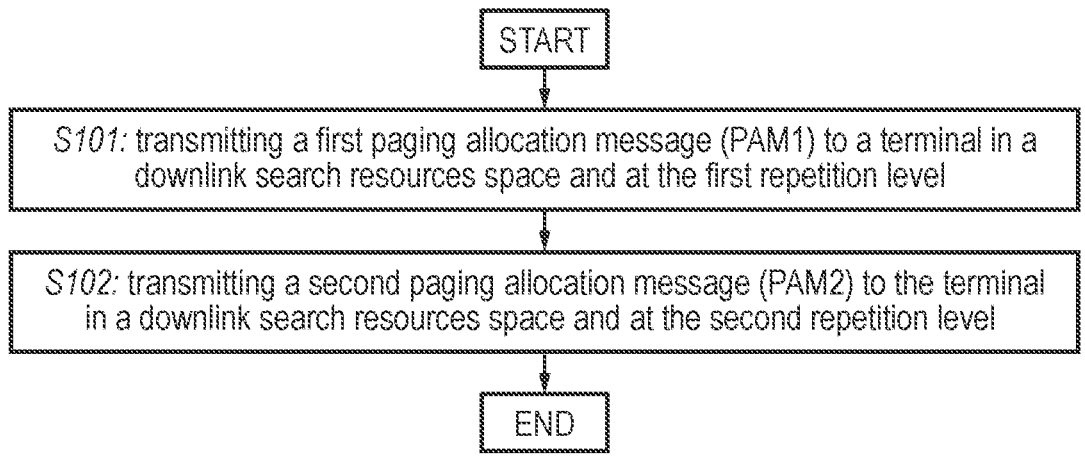
FIG. 10 illustrates an example paging method in accordance with the present disclosure.

FIG. 10 illustrates an example paging method in accordance with the present disclosure. Once this method starts, a first paging allocation message (PAM1) is transmitted in a downlink search resources space and at a first repetition level at step S101 and a second paging allocation message (PAM2) is transmitted in a downlink search resources space and at a second repetition level with (strictly) more repetitions (N2) than the number of repetitions (N1) for the first repetition level. In some examples, PAM1 and PAM2 allocate paging resources in a paging resources space and/or may the paging information for the terminal may be transmitted via PAM1 or PAM2. As previously mentioned, PAM1 and PAM2 transmissions could be starting at the same time or at different times, and could also be in the same frequency band or in different frequency bands. In one example transmitting PAM2 comprises transmitting PAM1: if for example they allocate the same set of resources, the content of the allocation messages can be identical and transmitting the allocation message N2 times also implies transmitting it N1 times. In a case where the paging information is comprised in the paging allocation messages (see for the example the discussion above regarding indications of SI change, ETWS and CMAS message being broadcasted to all terminal in a DCI message), then no further messages may be transmitted for paging the terminal. While previously a terminal would be paged at a specific coverage level, in the present disclosure two or more paging allocation messages may be sent to the same terminal and at different coverage/repetition levels, thereby increasing the chances of reaching the terminal quicker. It is pointed out that in some cases, by paging the terminal at multiples repetition or coverage levels, more resources may be used (e.g. if different narrowbands are used for the different repetition levels, sending a DCI at three repetition levels would increase the number of resources used compared to sending a DCI at a single coverage level) however, it is expected that in some situations, this can be at least in part compensated by a faster paging of terminals. It will be apparent to the skilled person that the messages PAM1 and PAM2 can be transmitted to the terminal either in the form of a unicast message addressed to the terminal or in the form of a broadcast message sent to all terminals in an area (e.g. a serving cell), including the terminal.

In cases where a paging message is to be transmitted to carry the paging information, then an additional option al step may be carried out where a paging message (PM) is transmitted in paging resources allocated by PAM1 and/or PAM2. In some examples, the paging resources indicated in each of PAM1 and PAM2 start at the time and/or use the same frequency band, and in some examples they start at different times and/or use different frequency bands. The PM is transmitted at the first and second repetition levels and from a start time determined based on a decoding time of PAM1. Accordingly, even if a terminal using the second repetition level may not yet be able to received and decode the PM, a terminal operating at the first repetition level may receive the PM and accordingly, receive the corresponding information earlier and, if appropriate, can start a communication with the base station earlier.

Figure 11:
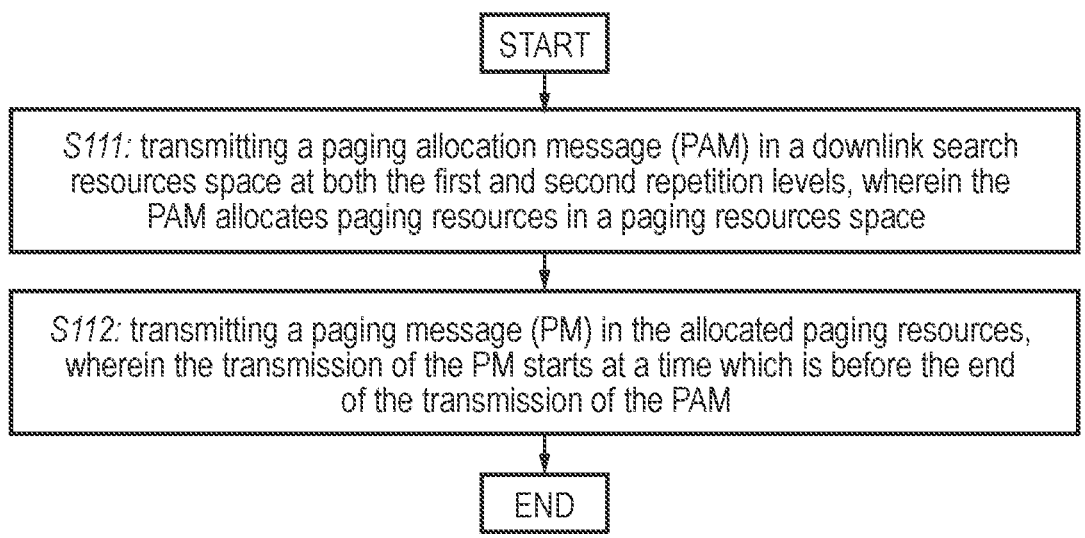
FIG. 11 illustrates an example paging method in accordance with the present disclosure.

FIG. 11 illustrates an example paging method in accordance with the present disclosure. The method starts and at S111, a paging allocation message (PAM) is transmitted in a downlink search resources space at both the first and second repetition levels, wherein the PAM allocates paging resources in a paging resources space. Then at S112, a paging message (PM) is transmitted in the allocated paging resources, wherein the transmission of the PM starts at a time which is before the end of the transmission of the PAM. While conventionally the transmission of the PM would have to start from after the transmission of the PAM at the highest repetition level, with the present disclosure, the transmission can be started before such that terminals which can decode the PAM at a lower repetition level can start receiving and decoding the PM earlier.

It is noteworthy that although the methods of FIGS. 10 and 11 have been presented as two different methods, they both rely on the same overall principles and concepts discussed herein and, in particular, may be combined with any adjustments that the skilled person would immediately identify in view of the teachings of the present disclosure. For example, a method may be used based on a combination of steps S101-S102 and S112 (wherein the transmission of the PM starts at a time which is before the end of the transmission of PAM2) and another method may be provided based on S111 and S103 (with a start time based on a decoding time for the PAM at the first repetition level).

Figure 12:
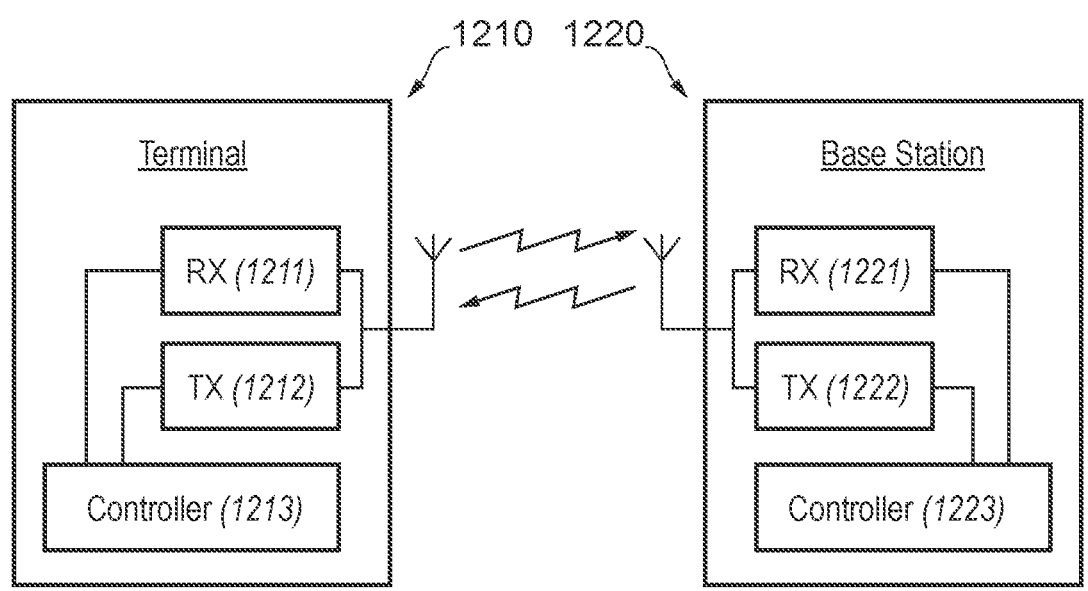
FIG. 12 illustrates an example terminal and an example base station for use in a telecommunications system.

FIG. 12 illustrates an example terminal and an example base station for use in a telecommunications system. In particular, FIG. 12 illustrates an example terminal (1210) and an example base station (1220) configured to communicate with each other and which may implement one or more techniques as discussed herein. The terminal 1210 comprises a receiver 1211 and a transmitter 1212 connected to an antenna for communicating via a wireless interface. The terminal also comprises a controller 1213 for controlling at least the receiver and transmitter of the terminal 1210. For example, the controller, receiver and transmitter may be configured to operate together to decode messages received by the receiver and that are transmitted at a first repetition level or at a second repetition level, wherein a message transmitted at the first repetition level is being repeated a number N1 of times and a message transmitted at the second repetition level is being repeated a number N2 of times, with N1<N2; to decode, at one of the first and second repetition levels, a paging allocation message received by the receiver in a search resources space, the paging allocation message being one of two paging allocation messages, each of the two paging allocation messages being sent at a different one of the first and second repetition levels. In some examples, the paging allocation message allocates paging resources in a paging resources space, and the controller, receiver and transmitter may be configured to operate together to decode, at the one of the first and second repetition levels, a paging message received by the receiver in the allocated paging resources and from a starting time determined based on a decoding time of the paging allocation message at the one of the first and second repetition levels.

Likewise, the base station 1220 comprises a receiver 1221 and a transmitter 1222 connected to an antenna for communicating via a wireless interface. The base station 1220 also comprises a controller 1223 for controlling at least the receiver and transmitter of the base station 1220. For example, the controller, receiver and transmitter may be configured to operate together to page a terminal or one or more terminals via a wireless interface, the terminal/one or more terminals being operable to decode received messages that are transmitted at a first repetition level or at a second repetition level, wherein a message transmitted at the first repetition level is being repeated a number N1 of times and a message transmitted at the second repetition level is being repeated a number N2 of times, with N1<N2. In particular, the mobile node being configured to page the terminal/one or more terminals comprises the controller, receiver and transmitter being configured to operate together to: instruct the transmitter to transmit a first paging allocation message to the terminal/one or more terminals in a downlink search resources space and at the first repetition level; instruct the transmitter to transmit a second paging allocation message to the terminal/one or more terminals in a downlink search resources space and at the second repetition level. In some examples, the first and second paging allocation messages allocate paging resources in a paging resources space; and the controller, receiver and transmitter are configured to operate together to instruct the transmitter to transmit a paging message in the allocated paging resources, at the first and second repetition levels and from a start time determined based on a decoding time of the first paging allocation message Also, while the paging has generally been discussed herein from the perspective of a base station paging a terminal, in other cases, the paging and/or transmission of the paging messages may be carried out by other examples of mobile nodes, such as infrastructure unit, a relay node and a terminal or any other examples of mobile node that can communicate via the wireless interface. For example a relay node may need to page one or more terminals and/or to relay paging-related message to one or more terminals.

While FIG. 12 shows a schematic illustration of a terminal and of a base station, it will be appreciated that while in examples of the present disclosure, each terminal includes a transmitter, receiver and controller and each base station includes a transmitter, receiver and controller so as to allow communication between the terminals and/or base stations, the terminal and base station may be implemented using any appropriate technique. For example, the controller may comprise one or more processor units which are suitably configured/programmed to provide the desired functionality described herein using conventional programming/configuration techniques for equipment in wireless telecommunications systems. For each terminal, the transmitter, receiver and controller are schematically shown in FIG. 12 as separate elements for ease of representation. However, it will be appreciated that for each terminal the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminals will in general comprise various other elements associated with their operating functionality in accordance with established wireless telecommunications techniques (e.g. a power source, possibly a user interface, and so forth).

There has therefore been described an arrangement where different repetition levels can be accommodated for in a manner that enables a terminal with a high repetition level to decode paging messages (thereby helping with delays caused by potential repetition level ramp-ups), while a terminal with a low repetition level may still decode paging messages before the other terminal (thereby reducing the delay caused by having to receive all communication at a higher/the highest repetition level). Rather than paging each terminal (either individually or through a broadcast message) at a repetition/coverage level and adjust the level later if need be, the same paging information can be transmitted to the each terminal at different repetition levels which can facilitate a quick paging of the terminal.

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. For example, steps S101-S102 may be carried out one before the other (S101-S102 or S102-S101) and in some examples they may partially or fully overlap. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered (for example a single MAC message may correspond to a plurality of resource elements).

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system.

Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more or a mobile terminal (e.g. an LC-MTC terminal), a relay node, a base station or any other mobile node may be configured accordingly if appropriate, so long as it is technically feasible.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or LC-MTC, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard (e.g. the 5G standards). For example, the search resources space has generally been referred to as MPDCCH but is not limited to a MPDCCH and the paging resources space has generally been referred to as PDSCH but is not limited to this example. Likewise, transmitting a paging allocation message may have been discussed in the context of transmitting a DCI (e.g. on an MPDCCH), sometimes referred to as transmitting an MPDCCH for brevity, while transmitting a paging message may have been discussed in the context of transmitting a paging message (e.g. on an PDSCH), sometimes referred to as transmitting an PDSCH for brevity, but the present disclosure is not limited to either of or both these examples.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Respective features of the present disclosure are defined by the following numbered clauses:

1. A method of transmitting paging information to a terminal in a telecommunications system via a wireless interface, wherein the terminal is operable to decode received messages that are transmitted at a first repetition level or at a second repetition level, wherein a message transmitted at the first repetition level is being repeated a number N1 of times and a message transmitted at the second repetition level is being repeated a number N2 of times, with N1<N2, the method comprising: transmitting a first paging allocation message to the terminal in a downlink search resources space and at the first repetition level; and transmitting a second paging allocation message to the terminal in a downlink search resources space and at the second repetition level.

Clause 2. The method of clause 1 wherein the first paging allocation message and the second paging allocation message comprise the paging information.

Clause 3. The method of clause 1, the first and second paging allocation messages allocating paging resources in a paging resources space, the method further comprising: transmitting the paging information in the allocated paging resources and via one or more paging messages, the one or more paging messages being transmitted at the first and second repetition levels, wherein the paging information is transmitted from a start time determined based on a decoding time for the first paging allocation message.

Clause 4. The method of clause 3 wherein transmitting the paging information comprises transmitting the one or more paging messages until an end time based on a decoding of the second paging allocation message and of the paging message at the second repetition level.

Clause 5. The method of clause 3 or 4 wherein the transmission of the paging information starts at a time which is before the end of the transmission of the second paging allocation message.

Clause 6. The method of one of clauses 3 to 5 wherein the first paging allocation message is for allocating first paging resources in the paging resources space and the second paging allocation message is for allocating second paging resources in the paging resources space;

a first of the one or more paging messages is transmitted at the first repetition level in the first paging resources; and a second of the one or more paging messages is transmitted at the second repetition level in the second paging resources.

Clause 7. The method of clause 6 wherein the first and second paging resources are one of more of:

selected from the same frequency bandwidth;
selected from different frequency bandwidths;
selected to start at the same transmission time; and
selected to start at different transmission times.

Clause 8. The method of any one of clauses 3 to 7 further comprising a terminal decoding the first paging allocation message at the first repetition level and decoding at least one of the one or more paging messages, from the start time, at the first repetition level.

Clause 9. The method of any one of clauses 3 to 8 further comprising a terminal decoding the second paging allocation message at the second repetition level and starting the receiving of at least one of the one or more paging messages from a time later than the start time.

Clause 10. The method of any one of clauses 3 to 9 wherein transmitting the paging information comprises transmitting the paging information at the first repetition level in the same bandwidth as the bandwidth for transmitting the paging information at the second repetition level.

Clause 11. The method of any one of clauses 3 to 9 wherein transmitting the paging message comprises transmitting the paging information at the first repetition level in a bandwidth that is different from the bandwidth for transmitting the paging information at the second repetition level.

Clause 12. The method of any one of clauses 3 to 11 wherein the first paging allocation message is allocating first paging frequency resources in the paging resources space which are identical to second paging frequency resources allocated by the second paging allocation message in the paging resources space.

Clause 13. The method of any one of clauses 3 to 11 wherein the first paging allocation message is allocating first frequency paging resources in the paging resources space which are different from second frequency paging resources allocated by the second paging allocation message in the paging resources space.

Clause 14. The method of any preceding clause wherein the transmission of the first paging allocation message starts at the same time as the transmission of the second paging allocation message.

Clause 15. The method of any preceding clause wherein the first paging allocation message is transmitted in the same bandwidth as the bandwidth for transmitting the second paging allocation message.

Clause 16. The method of any one of clauses 1 to 14 wherein the first paging allocation message is transmitted in a bandwidth that is different from the bandwidth for transmitting the second paging allocation message.

Clause 17. The method of any preceding clause wherein the terminal is operable to decode received messages that are transmitted at a medium repetition level, wherein a message transmitted at the medium repetition level is being repeated a number N-med of times, with N1<N-med<N2, the method further comprising:

transmitting a further paging allocation message in the downlink search resources space at the medium repetition level, the further paging allocation message allocating further paging resources in the paging resources space; and optionally, transmitting a paging message in the further allocated paging resources at the medium repetition level, the paging message comprising the paging information.

Clause 18. A method of operating a mobile node in a telecommunications system for paging a terminal via a wireless interface, wherein the terminal is operable to decode received messages that are transmitted at a first repetition level or at a second repetition level, wherein a message transmitted at the first repetition level is being repeated a number N1 of times and a message transmitted at the second repetition level is being repeated a number N2 of times, with N1<N2, the method comprising: instructing the transmitter to transmit a first paging allocation message to the terminal in a downlink search resources space and at the first repetition level;

instructing the transmitter to transmit a second paging allocation message to the terminal in a downlink search resources space and at the second repetition level.

Clause 19. A mobile node for use in a telecommunications system, wherein the mobile node comprises: a transmitter; a receiver; and a controller, wherein the mobile node is configured to page a terminal via a wireless interface, wherein the terminal is operable to decode received messages that are transmitted at a first repetition level or at a second repetition level, wherein a message transmitted at the first repetition level is being repeated a number N1 of times and a message transmitted at the second repetition level is being repeated a number N2 of times, with N1<N2, the mobile node being configured to page the terminal comprising the controller being configured to:

instruct the transmitter to transmit a first paging allocation message to the terminal in a downlink search resources space and at the first repetition level;

instruct the transmitter to transmit a second paging allocation message to the terminal in a downlink search resources space and at the second repetition level.

Clause 20. The mobile node of clause 19, wherein the mobile node is one of a base station, an infrastructure unit, a relay node and a terminal.

Clause 21. Integrated circuitry for a mobile node for use in a telecommunications system, wherein the integrated circuitry comprises a controller element and a transceiver element configured to operate together to page a terminal via a wireless interface, wherein the terminal is operable to decode received messages that are transmitted at a first repetition level or at a second repetition level, wherein a message transmitted at the first repetition level is being repeated a number N1 of times and a message transmitted at the second repetition level is being repeated a number N2 of times, with N1<N2, wherein the controller element and the transceiver element being configured to operate together to page the terminal comprises the controller element and the transceiver element being configured to operate together to:

instruct the transmitter to transmit a first paging allocation message to the terminal in a downlink search resources space and at the first repetition level;

instruct the transmitter to transmit a second paging allocation message to the terminal in a downlink search resources space and at the second repetition level.

Clause 22. A method of operating a terminal for use in a telecommunications system, wherein the terminal comprises a transmitter; a receiver; and a controller, the controller being configured to decode messages received by the receiver and that are transmitted at a first repetition level or at a second repetition level, wherein a message transmitted at the first repetition level is being repeated a number N1 of times and a message transmitted at the second repetition level is being repeated a number N2 of times, with N1<N2;

the method comprises decoding, at one of the first and second repetition levels, a paging allocation message received by the receiver in a search resources space, the paging allocation message being one of two paging allocation messages, each of the two paging allocation messages being sent at a different one of the first and second repetition levels.

Clause 23. A terminal for use in a telecommunications system, the terminal comprising: a transmitter; a receiver; and a controller, wherein the controller is configured to: decode messages received by the receiver and that are transmitted at a first repetition level or at a second repetition level, wherein a message transmitted at the first repetition level is being repeated a number N1 of times and a message transmitted at the second repetition level is being repeated a number N2 of times, with N1<N2;

decode, at one of the first and second repetition levels, a paging allocation message received by the receiver in a search resources space, the paging allocation message being one of two paging allocation messages, each of the two paging allocation messages being sent at a different one of the first and second repetition levels.

Clause 24. The terminal of clause 23 wherein the received paging allocation message allocates paging resources in a paging resources space, and the controller is further configured to decode, at the one of the first and second repetition levels, a paging message received by the receiver in the allocated paging resources and from a starting time determined based on a decoding time of the paging allocation message at the one of the first and second repetition levels.

Clause 25. Integrated circuitry for a terminal for use in a telecommunications system, wherein the integrated circuitry comprises a controller element and a transceiver element configured to: decode messages received by the receiver and that are transmitted at a first repetition level or at a second repetition level, wherein a message transmitted at the first repetition level is being repeated a number N1 of times and a message transmitted at the second repetition level is being repeated a number N2 of times, with N1<N2;

decode, at one of the first and second repetition levels, a paging allocation message received by the receiver in a search resources space, the paging allocation message being one of two paging allocation messages, each of the two paging allocation messages being sent at a different one of the first and second repetition levels.

Clause 26. A method of paging a terminal in a telecommunications system via a wireless interface, wherein the terminal is operable to decode received messages that are transmitted at a first repetition level or a second repetition level, wherein a message transmitted at the first repetition level are being repeated a number N1 of times and a message transmitted at the second repetition level are being repeated a number N2 of times, with N1<N2, wherein the method comprises: transmitting a paging allocation message in a downlink search resources space and at both the first and second repetition levels, the paging allocation message allocating paging resources in a paging resources space; and transmitting a paging message in the allocated paging resources, wherein the transmission of the paging message starts at a time which is before the end of the transmission of the paging allocation message.

Clause 27. Computer software which, when executed by a computer, causes the computer to perform the method of any one of clauses 1 to 17, 18, 22 and 26.

Clause 28. A storage medium which stores computer software according to clause 27.

Clause 29. A method of transmitting paging information to a terminal, a method of operating a mobile node, a mobile node for use in a telecommunications system, integrated circuitry for a mobile node, a method of operating a terminal, a terminal for use in a telecommunications system, integrated circuitry for a terminal, a method of paging a terminal in a telecommunications system, computer software and/or a storage medium substantially as hereinbefore described with reference to the drawings.

Clause 30. Any preceding clause wherein the mobile node and the terminal are operable to communicate via the wireless interface using at least one of: a 3GPP communication protocol, an LTE communication protocol, a 4G communication protocol and a 5G communication protocol.

REFERENCES

[1] 3GPP TS 22.368 version 13.1.0 Release 13 (2014-12)
[2] Holma H. and Toskala A., "LTE for UMTS OFDMA and SC-FDMA based radio access", John Wiley and Sons, 2009

The invention claimed is:

1. Integrated circuitry for a mobile node for use in a telecommunications system, the integrated circuitry comprising:

a transceiver; and
control circuitry configured to
decode received messages that are transmitted at a first repetition level or at a second repetition level, wherein a message transmitted at the first repetition level is repeated a number N1 of times and a message transmitted at the second repetition level is repeated a number N2 of times, with N1<N2; and
control the transceiver to page a terminal via a wireless interface by instructing the transceiver to transmit both (1) a first paging allocation message to the terminal in a downlink search resources space and at the first repetition level, and (2) a second paging allocation message to the terminal in the downlink search resources space and at the second repetition level.

2. The integrated circuitry of claim 1, wherein the first paging allocation message and the second paging allocation message each comprise paging information.

3. The integrated circuitry of claim 1, wherein
the first and second paging allocation messages allocate paging resources in a paging resources space, and
the control circuitry is further configured to control the transceiver to transmit paging information in the allocated paging resources and via one or more paging messages, the one or more paging messages being transmitted at the first and second repetition levels, and the paging information is transmitted front a start time determined based on a decoding time for the first paging allocation message.

4. The integrated circuitry of claim 3, wherein the transceiver transmits the paging information by transmitting the one or more paging messages until an end time based on a decoding of the second paging allocation message and of the paging message at the second repetition level.

5. The integrated circuitry of claim 3, wherein transmission of the paging information starts at a time which is before the end of the transmission of the second paging allocation message.

6. The integrated circuitry of claim 3, wherein
the first paging allocation message is for allocating first paging resources in the paging resources space,
the second paging allocation message is for allocating second paging resources in the paging resources space,
a first of the one or more paging messages is transmitted at the first repetition level in the first paging resources, and
a second of the one or more paging messages is transmitted at the second repetition level in the second paging resources.

7. The integrated circuitry of claim 3, wherein the transceiver transmits the paging information by transmitting the paging information at the first repetition level in the same bandwidth as the bandwidth transmitting the paging information at the second repetition level.

8. The integrated circuitry of claim 1, wherein transmission of the first paging allocation message starts at a same time as the transmission of the second paging allocation message.

9. The integrated circuitry of claim 1, wherein the first paging allocation message is transmitted in a same bandwidth as a bandwidth for transmission of the second paging allocation message.

10. The integrated circuitry of claim 1, wherein the first paging allocation message is transmitted in a bandwidth different from a bandwidth for transmission of the second paging allocation message.

11. Integrated circuitry for a terminal for use in a telecommunications system, the integrated circuitry comprising:
a transceiver; and
control circuitry configured to
decode messages received by the transceiver, wherein the messages are transmitted from another device at a first repetition level or at a second repetition level, a message transmitted at the first repetition level is being repeated a number N1 of times and a message transmitted at the second repetition level is being repeated a number N2 of times, with N1<N2; and
decode, at one of the first and second repetition levels, a paging allocation message received by the transceiver in a search resources space, the paging allocation message being one of two paging allocation messages, each of the two paging allocation messages being sent at a different one of the first and second repetition levels, wherein
the transceiver is configured to receive both (1) a first paging allocation message in a downlink search resources space and transmitted at the first repetition level, and (2) a second paging allocation message in the downlink search resources space and transmitted at the second repetition level.

12. The integrated circuitry according to claim 11, wherein
the received paging allocation message allocates paging resources in a paging resources space, and
the control circuitry is further configured to decode, at the one of the first and second repetition levels, a paging message received by the transceiver in the allocated paging resources and from a starting time determined based on a decoding time of the paging allocation message at the one of the first and second repetition levels.

13. The integrated circuitry according to claim 11, wherein the two paging allocation messages each comprise paging information.

14. The integrated circuitry according to claim 11, wherein
the two paging allocation messages comprise a first paging allocation message and a second paging allocation message, and
transmission of the first paging allocation message starts at a same time as the transmission of the second paging allocation message.

15. The integrated circuitry according to claim 11, wherein
the two paging allocation messages comprise a first paging allocation message and a second paging allocation message, and
the first paging allocation message is transmitted in a same bandwidth as a bandwidth for transmission of the second paging allocation message.

16. The integrated circuitry according to claim 11, wherein
the two paging allocation messages comprise a first paging allocation message and a second paging allocation message, and
the first paging allocation message is transmitted in a bandwidth different from a bandwidth for transmission of the second paging allocation message.

17. A method of paging a terminal in a telecommunications system via a wireless interface, wherein the terminal is operable to decode received messages that are transmitted at a first repetition level or a second repetition level, wherein a message transmitted at the first repetition level are being repeated a number N1 of times and a message transmitted at the second repetition level are being repeated a number N2 of times, with N1<N2, the method comprising:
transmitting both a first paging allocation message in a downlink search resources space at both the first repetition level and a second paging allocation message in the downlink search resources space at the second repetition level, the first and second paging allocation messages allocating paging resources in a paging resources space; and
transmitting a paging message in the allocated paging resources, wherein transmission of the paging message starts at a time which is before the end of the transmission of the paging allocation message.

18. The method according to claim 17, wherein transmitting the paging allocation message in the downlink search resources space and at both the first and second repetition levels comprises:
transmitting a first paging allocation message in the downlink search resources space and at the first repetition level; and
transmitting a second paging allocation message in the downlink search resources space and at the second repetition level.

19. The method according to claim 18, wherein transmission of the first paging allocation message starts at a same time as the transmission of the second paging allocation message.

20. The method according to claim 18, wherein the first paging allocation message is transmitted in a same bandwidth as a bandwidth for transmission of the second paging allocation message.

* * * * *